D. UNTHANK.
Cultivator.

No. 222,550. Patented Dec. 9, 1879.

WITNESSES:
Chas. Nida
C. Sedgwick

INVENTOR:
D. Unthank
BY Munn & Co.
ATTORNEYS.

UNITED STATES PATENT OFFICE.

DANIEL UNTHANK, OF SPICELAND, INDIANA.

IMPROVEMENT IN CULTIVATORS.

Specification forming part of Letters Patent No. 222,550, dated December 9, 1879; application filed June 25, 1879.

*To all whom it may concern:*

Be it known that I, DANIEL UNTHANK, of Spiceland, in the county of Henry and State of Indiana, have invented a new and useful Improvement in Adjustable Two-Horse Cultivators, of which the following is a specification.

Figure 1:
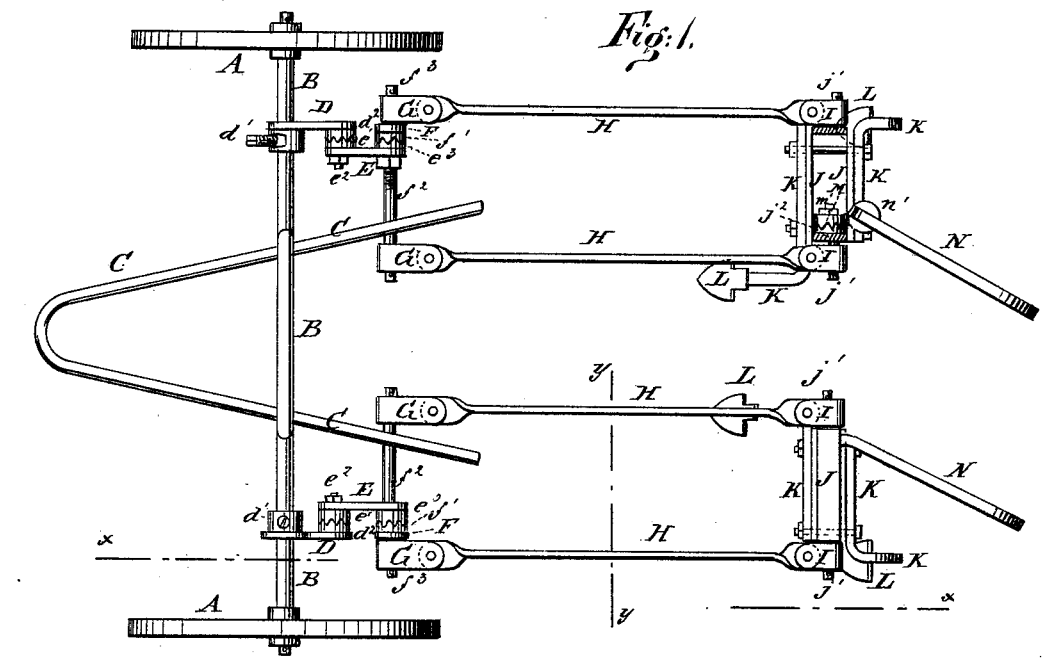
Figure 2:
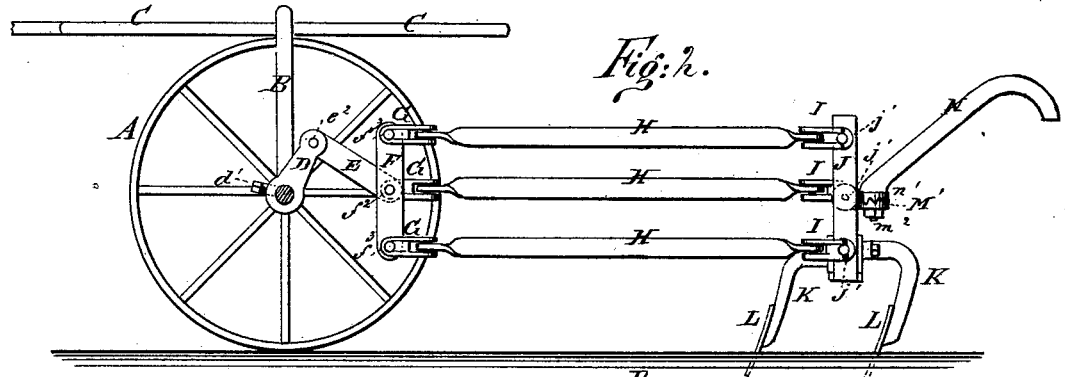
Figure 3:
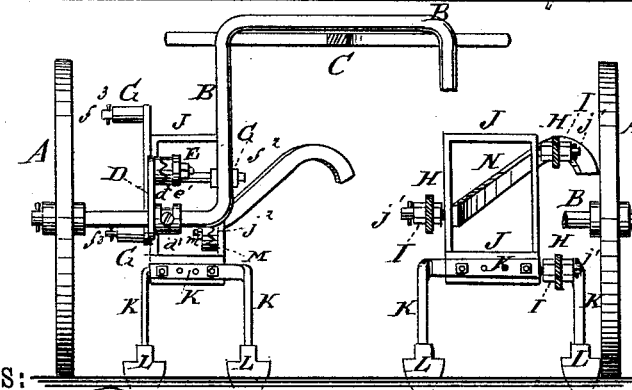

Figure 1 is a top view of my improved two-horse cultivator. Fig. 2 is a side view of the same, partly in section through the line $x\ x$, Fig. 1. Fig. 3 is a front view of the same, partly in cross-section through the line $y\ y$, Fig. 1.

Similar letters of reference indicate corresponding parts.

The object of this invention is to furnish an improved two-horse cultivator which shall be so constructed that the plows may be moved laterally and vertically without changing their pitch, that it may be adjusted to give the plows any desired pitch to cause them to work deeper or shallower in the ground, and to work closer to or farther from the rows of plants, and that it will allow the handles to be adjusted laterally and vertically, as may be desired.

The invention consists in the combination of the set of three parallel bars, provided with double-jointed couplings at the ends of each bar, with the frame to which the plow-standards are attached, and with the bars and crank-arm by which they are connected with the axle; in the combination of the two pairs of notched plates and their bolts with the connecting-bar, the crank-arm attached to the axle, and the bar with which the forward ends of the parallel bars are connected; in the combination of the double-notched plate and the two corresponding notched plates and their bolts with the handle and the frame to which the plow-standards are attached, and with which the rear ends of the parallel bars are connected, as hereinafter fully described.

A are the wheels, which revolve upon the journals of the axle B. The middle part of the axle B is bent four times at right angles, or is arched, so that it can pass over tall plants without injuring them. To the upper part of the bend or arch of the axle B is attached the forked rear end of the tongue C, so that the said tongue may pass over the plants without injuring them. Upon the horizontal end parts of the axle B are placed crank-arms D, the hubs of which are so formed that they may turn and slide upon the said axle, and which are secured in place, when adjusted, by set-screws $d'$.

The hubs of the crank-arms D may have short slots formed in them to receive the set-screws $d'$, to give the said cranks a little play. Upon the sides of the outer ends of the crank-arms D are formed notched plates $d^2$, which engage with the notched plates $e'$, formed upon the side of the forward ends of the connecting-bars E. The adjacent ends of the crank-arm D and the connecting-bar E and the notched clamping-plates $d^2\ e'$ are secured together by a bolt, $e^2$, so that they can be readily adjusted by loosening the nut of the said bolt $e^2$.

Upon the side of the rear ends of the connecting-bars E are formed notched plates $e^3$, which engage with the notched plate $f'$, formed upon the side of the middle part of the upright bar F. The bars E F are secured together by a nut screwed upon the pin $f^2$, which passes through the said bars E F. The pin $f^2$ projects inward, and to the ends of the upright bar F are attached two pins, $f^3$, projecting outward. The pins $f^3\ f^3\ f^2$ are thus horizontal, and upon them are placed coupling-blocks G, the outer ends of which are slotted horizontally, and to them, within the said slots, are pivoted the forward ends of the three parallel bars, H, so that the said three bars may have a free vertical and lateral movement. The rear ends of the three parallel bars H are inserted in slots formed in, and are pivoted to, coupling-blocks I, which are pivoted to pins $j'$, attached to the opposite sides of the small rectangular frame J. The frame J will thus be connected with the three bars H by a double-jointed connection, so that it may have a free vertical and lateral movement, and will always be held exactly parallel with the bar F, however it may be moved, thus keeping the plows at the same pitch. The pitch of the plows and the depth to which they work in the ground are regulated by adjusting the bars E and the crank-arms D in connection with the bars F and the axle B.

K are the plow-standards, to the lower ends of which are attached the plows L in the usual way. The middle parts of the rear standards K are bent forward, and the middle parts of the forward standards K are bent to the rearward, and the upper parts of all the standards K are bent inward horizontally, and are bolted to the bottom bars of the frame J. Several holes are formed in the bottom bars of the frame J and in the horizontal upper parts of the standards K, to receive the fastening-bolts, so that the plows L may be adjusted wider apart or closer together, as may be required. Upon the inner side bars of the frame J are formed notched plates $j^2$, the notches of which engage with the notches of the plate M. The notched plate M is secured to the notched plate $j^2$ and to the bar of the frame J by a bolt, $m'$. The notched plate M is vertical, and upon its rear edge is formed a horizontal notched plate, $M'$, the notches of which engage with the notches of the notched plate $n'$, formed upon the end of the handle N. The handle N and its notched plate $n'$ are secured to the notched plate $M'$ by a bolt, $m^2$, so that the said handle may be adjusted laterally or vertically by loosening one or the other of the bolts $m^2$ $m'$, as may be required.

Having thus described my invention, I claim as new and desire to secure by Letters Patent—

1. The combination of the set of three parallel bars, H, provided with double-jointed couplings G I at the ends of each bar, with the frame J, to which the plow-standards K are attached, and with the bars F E and crank D, by which they are connected with the axle B, substantially as herein shown and described.

2. The combination of the notched plates $d^2$ $e'$ and $e^3$ $f'$ and their bolts $e^2$ $f^2$ with the connecting-bar E, the crank-arm D, attached to the axle B, and the bar F, with which the forward ends of the parallel bars H are connected, substantially as herein shown and described.

3. The combination of the double-notched plate M $M'$ and the notched plates $j^2$ and $n'$ and their bolts $m'$ $m^2$ with the handle N and the frame J, to which the plow-standards K are attached, and with which the rear ends of the parallel bars H are connected, substantially as herein shown and described.

DANIEL UNTHANK.

Witnesses:
O. H. NIXON,
LEVI HOOVER.